United States Patent
Dean

(10) Patent No.: US 9,001,448 B2
(45) Date of Patent: Apr. 7, 2015

(54) PRE-AMPLIFIER OUTPUT STAGE WITH INTEGRATED TEST BUFFER

(71) Applicant: Texas Instruments Incorporated, Dallas, TX (US)

(72) Inventor: Douglas Warren Dean, Eagan, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/954,204

(22) Filed: Jul. 30, 2013

(65) Prior Publication Data

US 2014/0063639 A1 Mar. 6, 2014

Related U.S. Application Data

(60) Provisional application No. 61/696,970, filed on Sep. 5, 2012, provisional application No. 61/698,901, filed on Sep. 10, 2012.

(51) Int. Cl.
*G11B 5/02* (2006.01)
*G11B 20/10* (2006.01)

(52) U.S. Cl.
CPC ............ *G11B 5/02* (2013.01); *G11B 20/10027* (2013.01)

(58) Field of Classification Search
None
See application file for complete search history.

(56) References Cited

U.S. PATENT DOCUMENTS

| | | | | |
|---|---|---|---|---|
| 6,046,875 A * | 4/2000 | Siniscalchi et al. | ............. | 360/67 |
| 6,134,060 A * | 10/2000 | Ryat | ............... | 360/46 |
| 6,853,510 B2 * | 2/2005 | Chaiken et al. | ................. | 360/67 |
| 7,006,314 B2 * | 2/2006 | Takahashi | ....................... | 360/46 |
| 7,417,817 B1 * | 8/2008 | Aram et al. | ..................... | 360/68 |
| 7,558,014 B1 * | 7/2009 | Voo et al. | ........................ | 360/67 |
| 7,579,881 B2 * | 8/2009 | Bach | ............................ | 327/108 |
| 7,652,537 B2 | 1/2010 | Ngo | | |
| 7,675,704 B2 * | 3/2010 | Dean | ............................. | 360/67 |
| 7,692,887 B2 * | 4/2010 | Dolan et al. | .................... | 360/31 |
| 7,729,077 B2 * | 6/2010 | Tiwari et al. | .................... | 360/68 |
| 8,275,012 B2 | 9/2012 | Dean | | |
| 2002/0075584 A1 * | 6/2002 | Patti et al. | ....................... | 360/25 |
| 2003/0128450 A1 * | 7/2003 | Cheung et al. | ................. | 360/46 |
| 2006/0221489 A1 * | 10/2006 | Christianson et al. | ......... | 360/75 |
| 2008/0055760 A1 * | 3/2008 | Tiwari et al. | .................... | 360/46 |
| 2012/0275290 A1 | 11/2012 | Dean | | |
| 2012/0300606 A1 | 11/2012 | Li et al. | | |
| 2013/0039373 A1 | 2/2013 | Dean | | |
| 2013/0058368 A1 | 3/2013 | Dean et al. | | |
| 2013/0076266 A1 | 3/2013 | Dean et al. | | |
| 2013/0121357 A1 | 5/2013 | Warren et al. | | |

* cited by examiner

*Primary Examiner* — Dismery Mercedes
(74) *Attorney, Agent, or Firm* — Alan A. R. Cooper; Frank D. Cimino

(57) ABSTRACT

Disk drive pre-amplifier output stage circuitry is presented including a high pass input filter for removing DC offsets from differential read data signals and providing an input to AB drivers of the output stage, in which an offset test circuit selectively drives the high pass filter output nodes according to the offset at the filter input to facilitate measurement of the preceding circuit offset at the driver output terminals, and a common mode regulator circuit regulates common mode voltages at the first and second driver output nodes to a predetermined value in read and write modes.

19 Claims, 4 Drawing Sheets

PRE-AMPLIFIER OUTPUT STAGE WITH INTEGRATED TEST BUFFER

REFERENCE TO RELATED APPLICATION

This application claims priority to and the benefit of U.S. Provisional Patent Application Ser. Nos. 61/696,970, filed on Sep. 5, 2012 and entitled PRE-AMPLIFIER OUTPUT STAGE WITH INTEGRATED TEST BUFFER, and 61/698,901, Filed on Sep. 10, 2012 and entitled PRE-AMPLIFIER OUTPUT STAGE WITH INTEGRATED TEST BUFFER, the entireties of which are incorporated by reference herein.

FIELD OF THE INVENTION

The present disclosure relates to disk drive pre-amplifiers and specifically to pre-amplifier output stage circuitry.

BACKGROUND

Disk drives are used to store electronic data on a magnetically recordable disk medium, providing both read and write access via one or more heads that are disposed near the rotating disk. In certain disk drives, a coil is used to magnetize selected portions of the disk based on data being written to the drive, and a magnetoresistive sensor head is used to read data from the disk. Pre-amplifier circuitry is provided in the disk drive system to interface a host system with the read and write heads where the pre-amplifier is typically an integrated circuit with a connector for interconnection with a channel circuit or "channel chip" of the host system via a flexible cable. During data writing operations, data from the host system is provided to writer circuitry on the pre-amplifier for actuating the write coil. For reading operations, sensor signals from the read head are provided to one or more amplification or gain stages of the pre-amplifier circuit, and a pre-amp output stage includes driver circuitry to provide suitable data signals through the flexible cable to the host system. Problems may occur, however, if the common mode voltage at the driver outputs varies, particularly when switching between reading (or amplifying) and writing modes. For example, ever-increasing data rates reduce the time for the channel chip to recover when the pre-amplifier driver output circuit transitions from low impedance during read mode to high impedance for write mode operation, and recovery is hampered by significant changes in the pre-amplifier common-mode output voltage. In addition, system offset information is useful for dynamic range and distortion testing, and it may be desirable to measure other signals during testing. However, the pre-amplifier output stage typically includes input capacitors to remove DC offsets and to reference the driver output voltage to appropriate circuit ground for interfacing with the channel chip, and the pre-amplifier offset blocking capacitors prevent offset or other test signal measurement at the driver outputs. Accordingly, there is a need for improved disk drive pre-amplifier circuitry to facilitate offset measurements during testing and to mitigate output common mode voltage variations during operation.

SUMMARY

The present disclosure provides pre-amplifiers for disk drive systems with improved output stage circuits by which the output common mode voltage is controlled during reading and writing operations to facilitate fast mode changes, and which allow offset and other test signal measurements at the driver outputs. In certain embodiments detailed below, the output common mode voltage is regulated to a predetermined level in both read and write modes to mitigate or avoid offset variations to reduce mode change delays, and circuits are provided to facilitate measurement of the offset or other amplifier signals directly at the pre-amplifier output pins at or near unity gain during testing.

Disk drive pre-amplifiers and pre-amp output stage circuitry are provided according to one or more aspects of the present disclosure, in which the output stage includes a high pass filter receiving a differential input and providing a differential output at first and second filter output nodes, along with a driver circuit connected to the filter output nodes to provide a differential driver output at first and second driver output nodes. The pre-amplifier output stage also includes a regulator which regulates common mode voltages at the driver output nodes to a predetermined value in read mode and in write mode using feedback obtained from the driver output. The disclosed pre-amplifier output stage circuitry thus facilitates quick transitions between read and write modes while providing a stable common mode voltage to subsequent circuitry, such as a channel chip for interfacing the disk drive with a host system.

In certain embodiments, the regulator includes a transconductance amplifier with a first input connected to a reference voltage, a second input connected via feedback resistors to the driver output nodes, and an amplifier output to source or sink current to or from a rail node of the high pass filter in order to regulate the high impedance nodes at the driver circuit input. In this manner, the regulator sets the common mode voltage at the driver output nodes in accordance with the reference voltage value. Some embodiments also provide a switching circuit operative in write mode to connect the transconductance amplifier output to the second transconductance amplifier input so that the regulator sources or sinks current to or from the output feedback resistors to regulate the driver output common mode voltages according to the reference voltage. Thus, little or no change is seen in the driver output common mode voltage when the output stage is switched between read and write modes, thereby facilitating interfacing of the pre-amplifier with a connected channel chip or other external circuitry.

Certain embodiments of the output stage also include an offset test circuit operative in a test mode to provide a differential voltage signal at the filter output nodes based on a differential voltage at the filter inputs so as to regulate a differential voltage signal at the driver output nodes to be approximately the same as the differential voltage signal at the first and second filter inputs. In certain implementations, the offset test circuit includes emitter follower circuits connected to the filter input nodes, as well as first and second differential pair circuits that regulate the filter output node voltages such that the driver output voltages match those of the filter input nodes. In this manner, the output circuit allows measurement of offsets associated with preceding circuitry directly at the driver output during testing without having to pass signals through the high pass filter circuitry.

The output stage may further provide additional transconductance amplifiers connected to the filter output nodes for initially charging the high pass filter capacitors in transitioning from write mode to read mode. In certain implementations, moreover, a differential pair or other secondary test circuit is connected to the transconductance amplifier inputs and receives a differential secondary test voltage signal from a component associated with the disk drive. The secondary test circuit is activated in a secondary test mode to provide a differential output voltage signal to the transconductance amplifier inputs based on the differential secondary test voltage signal, and the transconductance amplifiers provide a differential voltage at the filter output nodes based on the differential output voltage from the secondary test circuit, such that the driver circuit provides the driver outputs to allow measurement of the differential secondary test voltage signal directly at the driver output nodes. A multiplexer circuit may be included to provide a differential voltage output signal to the secondary test circuit based on a selected one of two or more differential input voltage signals of interest, thus allowing the driver output stage to be used during testing to evaluate any number of signals associated with the pre-amplifier, such as a head disk interface sensor signal, etc., including the ability to measure DC signal values without passing through the high pass filter circuit.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
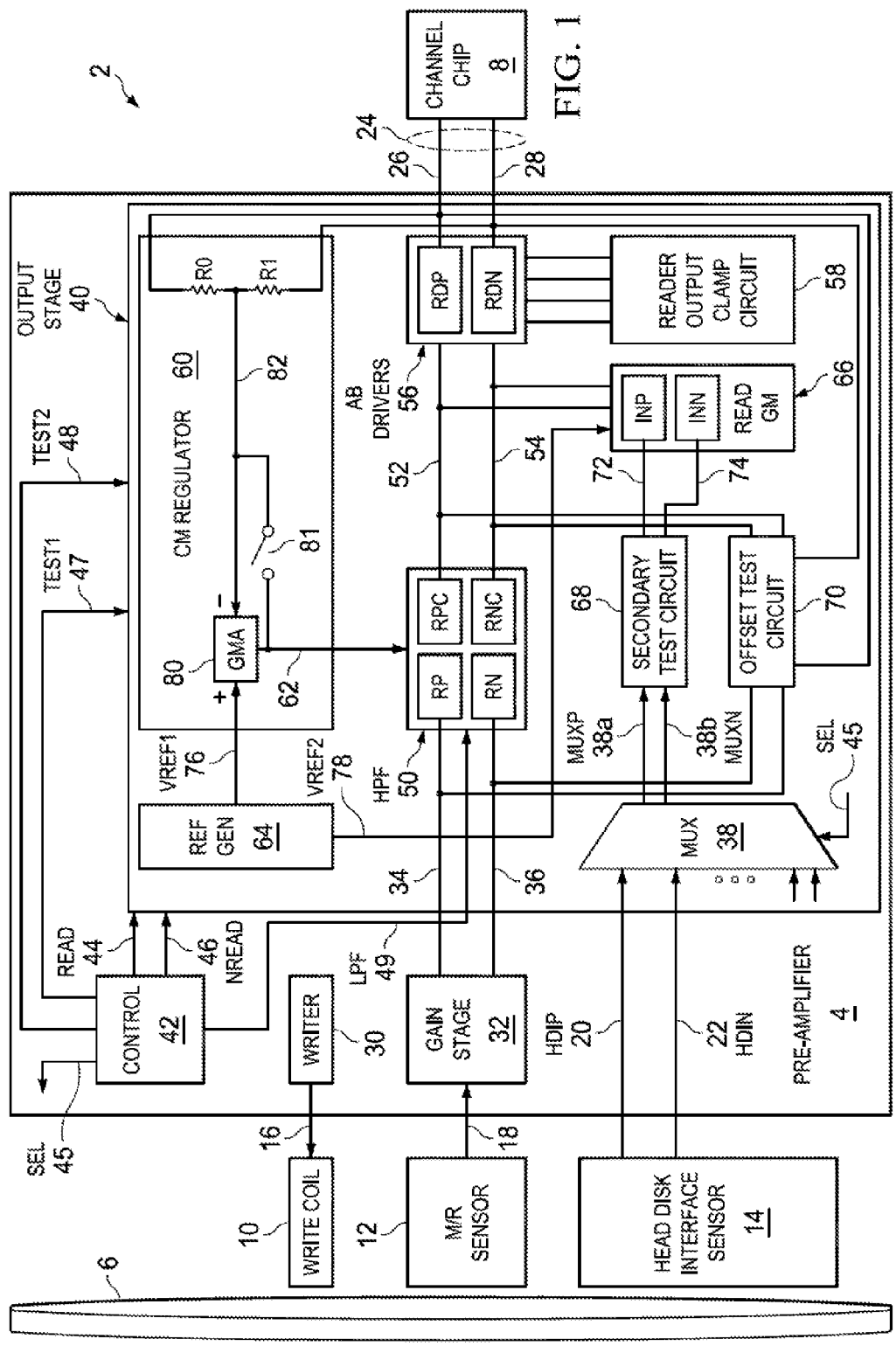
FIG. 1 is a simplified schematic diagram illustrating a disk drive system with a pre-amplifier to interface a recordable disk media with a channel chip, including a pre-amplifier output stage with an offset test circuit and a common mode regulator in accordance with one or more aspects of the present disclosure.

Disk drive pre-amplifiers and associated output stage circuitry are provided to facilitate fast transition between read and write modes by regulated control of the driver output common mode voltages, and to facilitate test mode measurement of pre-amplifier offset levels and other signals of interest. One or more embodiments or implementations are hereinafter described in conjunction with the drawings, wherein like reference numerals are used to refer to like elements throughout, and wherein the various features are not necessarily drawn to scale.

FIG. 1 illustrates a disk drive system 2 with a pre-amplifier 4 operatively interfacing a data storage disk medium 6 with a channel chip 8 via one or more interface heads including a write coil head 10, a magnetoresistive (M/R) sensor 12 and a head disk interface (HDI) sensor 14. The write coil 10 is operative during write mode operation to conduct alternating current according to write data 16 from a writer circuit 30 of the pre-amplifier 4 in order to selectively magnetize particular areas on the rotating disk media 6 and thus store corresponding data in electronic form (magnetically) on the disk 6. The magnetoresistive sensor 12 is used during read operations to sense magnetized states of select areas on the disk 6 and to provide read signals 18 to one or more gain stages 32 of the pre-amplifier 4 for signal conditioning and amplification to provide read data to the channel chip 8. The head disk interface sensor 14 may be a resistive sensor element or other suitable sensor that detects the proximity of the write and read heads 10 and 12 to the rotating disk 6, and provides a differential voltage signal on positive and negative lines 20 and 22 (HDIP and HDIN in the figure) to a multiplexer 38 in the pre-amplifier. The pre-amplifier 4 in certain implementations is a single integrated circuit device disposed in a hard disk drive enclosure, and includes an output connector (not shown) to provide read data on lines 26 and 28 to the channel chip 8 via a flexible cable 24, allowing connection and interfacing of the disk drive system to a host system (not shown).

With respect to read operation, the sensor data 18 is conditioned by the gain stage(s) 32 and a differential output signal is provided on reader positive and reader negative lines 34 and 36 (RP and RN in the figure) to an output stage 40 of the pre-amplifier 4. The output stage 40 optionally includes a multiplexer (MUX) 38 for measurement of a selected one of a plurality of differential input signals from components are circuitry associated with the disk drive system 2, such as the output of the head disk interface sensor 14. The pre-amplifier 4 further includes a mode control circuit 42 providing various control signals for operating the pre-amplifier 4 and the output stage 40 thereof in various modes. In the illustrated system 2, for example, the pre-amplifier output stage 40 is operable in a read mode, a write mode, and first and second test modes as described further hereinafter. As shown in FIG. 1, the controller 42 provides a read control signal (READ) 44 and a complementary write control signal (NREAD) 46, as well as a multiplexer select signal (SEL) 45 for channel selection by the multiplexer 38, and first and second test mode signals (TEST1 and TEST2) 47 and 48.

Figure 2:
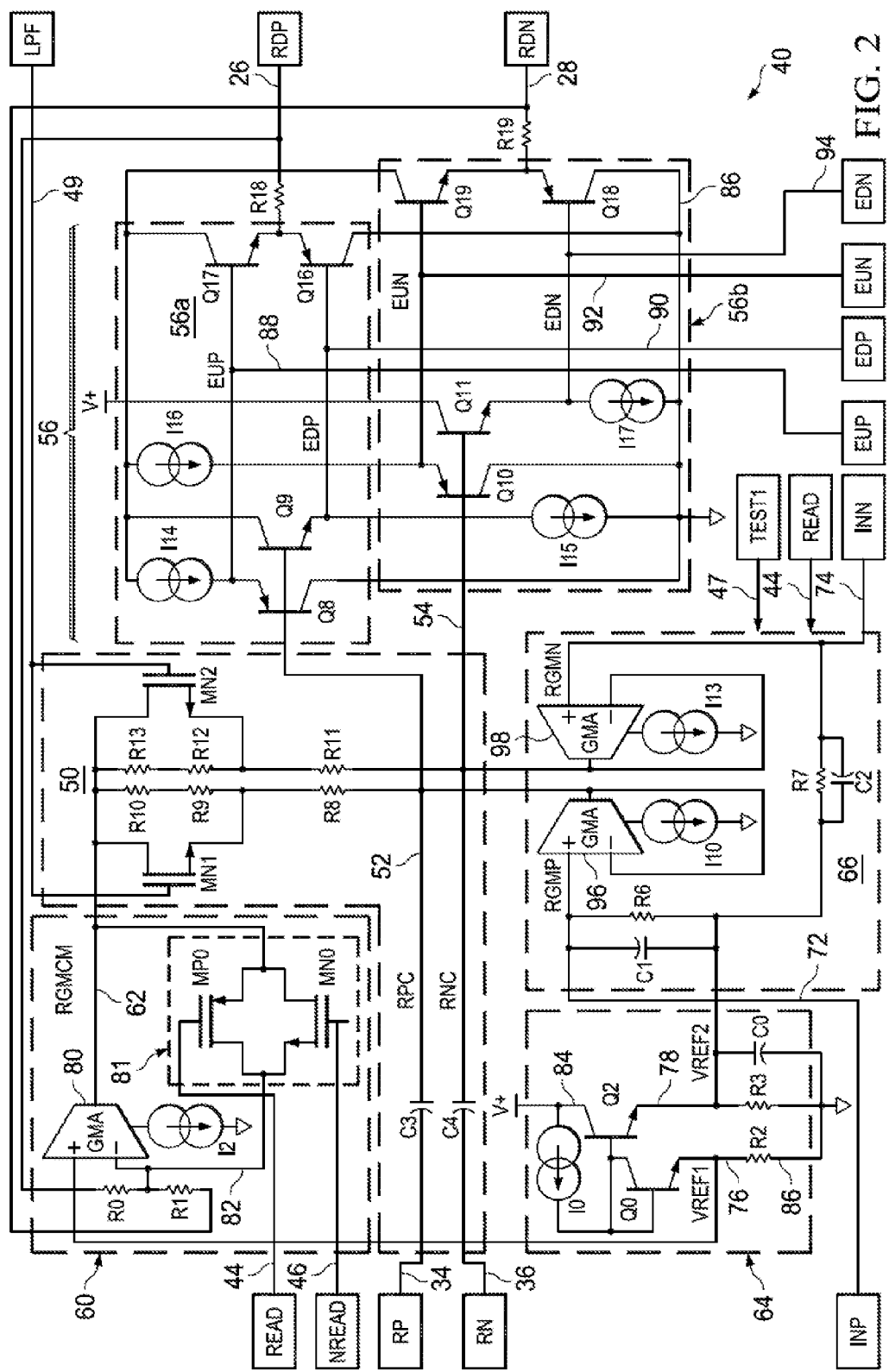
FIG. 2 is a schematic diagram illustrating further details of the pre-amplifier output stage of FIG. 1.

Referring also to FIG. 2, the output stage 40 includes a high pass filter 50 with first and second filter inputs 34 and 36 that receive the differential input from the preceding gain stage 32, and the high pass filter circuit 50 provides a differential filter output to first and second filter output nodes 52 and 54 (labeled RPC and RNC in the figures). The filter output nodes 52 and 54 are provided as driver inputs to an output driver circuit 56, and the circuit 56 provides a differential driver output at first and second driver output nodes 26 and 28 for driving the channel chip 8 through the flexible cable 24. In certain embodiments, as described further below in connection with FIG. 4, a reader output clamp circuit 58 is operatively coupled to internal nodes of the driver circuitry 56 to selectively clamp the output nodes 26 and 28 during write mode operation. The output stage 40 further includes a common mode regulator circuit 60 with an amplifier 80 having an output controlling a filter rail node 62 of the high pass filter 50. A feedback switching circuit 81 selectively connects or disconnects the amplifier output to/from an input for direct common mode control during write operation and closed loop common mode output control during read mode as described further below according to a reference voltage VREF1 76 from a reference generator 64. The output stage 40 also includes a reader transconductance circuit 66 (READ GM) connected to the filter output nodes 52 and 54. In addition, a secondary test circuit 68 and an offset test circuit 70 are provided for test mode operation, with the secondary test circuit 68 being connected to receive a differential signal from positive and negative multiplexer output lines 38a (MUXP) and 38b (MUXN) and to provide a differential input on lines 72 and 74 to the read transconductance amplifier circuit 66. The offset test circuit 70 is connected to the filter input nodes 34 and 36, the filter output nodes 52 and 54, and to the driver output nodes 26 and 28 as shown in FIG. 1 to facilitate measurement of offsets at the output of the gain stage 32 using the driver output nodes 26 and 28.

As best seen in FIG. 2, the high pass filter 50 includes capacitors C3 and C4 connected respectively between the filter inputs 34 and 36 and the filter output nodes 52, 54. Each of the capacitors C3 and C4 forms a high pass filter with corresponding resistor networks R8-R10 and R11-R13 connected between the filter output nodes 52, 54 and a filter rail node 62 controlled by the output of a transconductance amplifier 80 of the regulator circuit 60. In the illustrated implementation, moreover, the corner frequency of the resulting high pass filters is adjustable by a configuration circuit including N-channel MOSFETs MN1 and MN2 controlled by a frequency control signal 49 (shown as LPF in the figures) to selectively short out one or more of the resistors to adjust the corresponding R-C time constant and hence the corner frequency. The illustrated example provides a first setting (LPF low) in which the corner frequency for the positive filter circuit is set by C3 and the resistances of R8-R10, and the negative filter frequency is set by C4 and the resistors R11-R13. A second setting is provided (LPF high to short out resistors R9, R10, R12 and R13) with the filter frequency set by C3 and R8 and by C4 and R11. Any number of individual resistor elements and corresponding shorting transistors can be used to form a programmable high pass filter. In addition, any suitable high pass filter circuit can be used in conjunction with the various aspects of the present disclosure, whether adjustable or fixed. In read mode, the differential signal from the preceding amplifier gain stage or stages 32 enters the filter input nodes 34 and 36 (RP and RN) and goes into the capacitors C3 and C4, which block the DC signal from the preceding stages. The high pass filter 50 also functions to re-reference the output voltage to reduce its variation and dependence upon any supply.

The filter output nodes 52 and 54 are provided as inputs to the driver circuit 56. Any suitable driver circuit can be used which has first and second driver inputs and provides a differential driver output at the first and second driver output nodes 26 and 28. The illustrated driver circuitry 56 includes AB drivers 56a and 56b with driver inputs connected to the filter output nodes 52 and 54. The exemplary AB drivers 56a and 56b provide unity again with very high input impedance and very low output impedance, although other suitable driver circuitry and configurations can be used. During normal read operation, the drivers 56a and 56b provide a differential driver output at the driver output nodes 26 and 28, and the driver circuit 56 may be selectively disabled or clamped making the outputs 26 and 28 high impedance using a reader output clamp circuit 58 as described further below in connection with FIG. 4. After the filter capacitors C3 and C4, the read signal at nodes RPC and RNC goes into the AB drivers including transistors Q8-Q11 and Q16-Q18. From the AB drivers 56a and 56b, the read signal goes into resistors R18 and R19 and then to external circuitry (e.g., channel chip 8 in FIG. 1). In one possible implementation, the signal is unity gain and the output driver is 100 ohms such that when a termination resistor is added, the signal is divided in half. The AB drivers 56 in the illustrated embodiment thus provide unity gain buffers to drive a 100 ohm termination, although other embodiments are possible providing non-unity gain and/or to drive any suitable termination impedance.

The drivers 56 are connected between a positive voltage node 84 (V+) and a circuit ground node 86 to provide the driver outputs forming a differential voltage signal at the positive and negative output nodes 26 and 28 based on the output of the high pass filter 50. The positive filter output 52 is connected to the bases of a PNP transistor Q8 and an NPN transistor Q9 of the first AB driver 56a, with Q8 biased by current source 114 and Q9 being biased by a current source 115. Similarly, the negative filter output 54 drives the bases of transistors Q10 and Q11, which are biased respectively by 116 and 117. In the first driver 56a, the emitter of Q8 provides a signal 88 (EUP) to the base of an upper NPN output transistor Q17, and the emitter of Q9 provides a signal 90 (EDP) to the base of a PNP transistor Q16, with the emitters of Q16 and Q17 being connected to one another to drive the positive output node 26 via output resistor R18 as shown. In similar fashion, the second driver 56b includes PNP transistor Q10 and NPN transistor Q11 whose bases receive the second filter output 54 and which are driven by current sources 116 and 117 as shown. The emitter of Q10 provides a signal 92 (EUN) to the base of an upper output (NPN) transistor Q19, and the emitter of Q11 provides a signal 94 (EDN) to the base of a PNP transistor Q18, where the emitters of Q18 and Q19 drive the negative output node 28 via resistor R19. The biasing current sources 114-117 can be scaled in certain implementations for low quiescent power and various output impedances, including the resistance looking into the emitters of the AB driver devices in addition to the resistances of R18 and R19.

The regulator circuit 60 (RGMCM) operates in one of two modes in order to control or regulate the common mode voltages at the driver outputs 26 and 28 using a regulator amplifier 80 and feedback resistors R0 and R1 connected respectively to the first and second driver outputs 26 and 28 as shown. The amplifier 80 in the illustrated example is a transconductance amplifier (GMA) having an output connected to the upper rail 62 of the high pass filter circuit 50 so as to selectively source or sink current to or from the filter circuit output nodes 52 and 54 via the connected resistors R8-R13.

In addition, as best shown in FIG. 2, the regulator circuit 60 includes a pass gate or switching circuit 81 implemented in this example using a P-channel MOSFET MP0 with a gate driven by the read mode signal READ 44 and an N-channel MOSFET MN0 driven by the inverse write mode signal NREAD 46. In operation, the switching circuit 81 connects the output of the transconductance amplifier 80 to the inverting input 82 during write mode operation when the driver circuit 56 is disabled or clamped (e.g., using the reader output clamp circuit 58 of FIG. 4 below) such that the transconductance amplifier 80 sources or sinks current to or from the output nodes 26 and 28 through the resistors R0 and R1, respectively to directly control the common mode voltages at the driver outputs 26 and 28. During read operation, the READ signal 44 is high, and the NREAD signal 46 is low, thereby turning off the pass gate switching circuit 81. In this configuration, the transconductance amplifier output sources or sinks current to or from the filter output nodes 52 and 54 via the filter rail node 62 and the filter resistance networks to control the output common mode voltage while the driver circuit 56 is operating, using driver output common mode feedback via resistors R0 and R1 in closed loop fashion. The common mode regulation aspects of the output stage 40 are thus provided using the regulator circuit 60.

In addition, the regulation is done according to a reference voltage 76 (VREF1) provided by the reference generator circuit 64. As seen in FIG. 2, the illustrated reference generator circuit 64 includes a current source I0 and a diode-connected NPN transistor Q0 connected between the positive voltage node 84 and the reference node 76, with a resistor R2 connected between the first reference output 76 and the circuit ground node 86. In one possible example, a one volt reference VREF1 is provided by the circuit 64 using a current source I0 of about 100 µA and a resistance R2 of about 10 K ohms, although any suitable reference voltage 76 may be provided using any suitable reference voltage circuitry 64. The first reference voltage 76 is connected to the non-inverting (+) input of the transconductance amplifier 80, with the inverting input (−) being connected to the circuit node 82 for closed loop operation to regulate the driver output common mode voltage around the reference voltage level VREF1 when the switch 81 is off during read mode operation. In write mode, the switch 81 is on, and the output driver circuit 56 is deactivated, with the transconductance amplifier 80 directly controlling the center node between R0 and R1 to again regulate the common mode voltages at the output nodes 26 and 28 according to the reference voltage 76. In this manner, transitioning the output stage 40 between read mode and write mode does not result in significant changes in the output common mode voltage, and downstream circuitry (e.g., channel chip 8 in FIG. 1 above) can begin operation after a mode change quickly without having to wait while output circuit voltages settle as was the case in conventional disk drive pre-amplifier output stages.

Figures 3, 4:
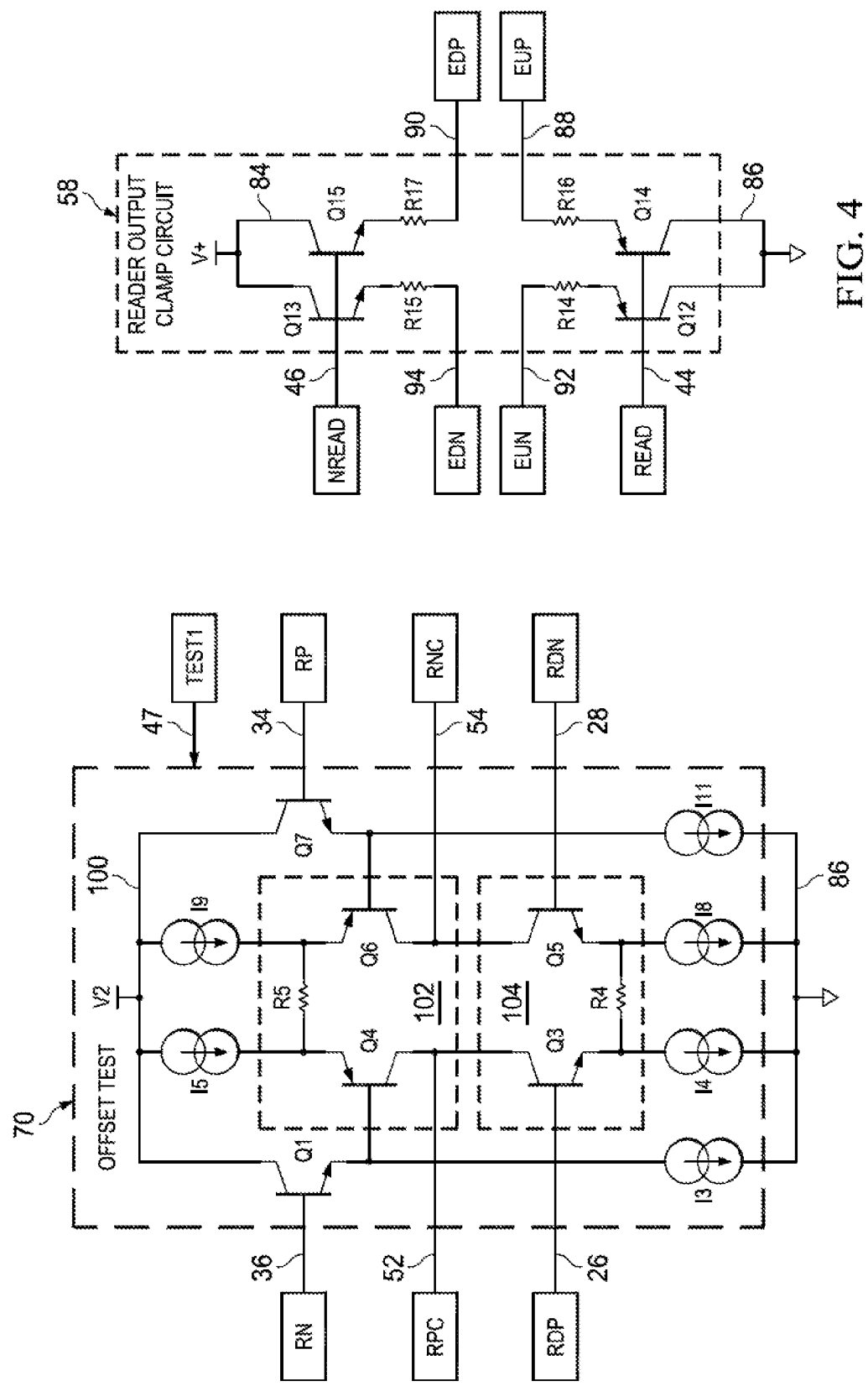
FIG. 3 is a schematic diagram illustrating an exemplary offset test circuit which may be used in the output stage of FIGS. 1 and 2.
FIG. 4 is a schematic diagram illustrating a reader output clamp circuit which may be used in the output stage of FIGS. 1 and 2.

Referring now to FIGS. 2 and 4, a clamp circuit 58 (FIG. 4) is connected to the internal nodes 88, 90, 92 and 94 (EUP, EDP, EUN and EDN) of the driver circuit 56, and operates during write mode to selectively place the differential driver output in a high impedance state. In this example, a bipolar clamp circuit 58 is used, but other forms of clamp circuitry can be employed to effectively deactivate the driver circuitry 56 while the pre-amplifier 4 is in write mode. Assertion of the NREAD signal 46 (high) and corresponding deactivation of the READ signal 44 (low) operates to turn on the transistors Q12-Q15, and thus Q13 and Q15 pull up one side of the AB driver (EDN & EDP pulled up to V+) through corresponding resistors R15 and R17, and the PNP transistors Q12 and Q14 pull down the other side through corresponding resistors R14 and R16 (EUN & EUP pulled to ground). In this manner, the driver output nodes 26 and 28 (RDP and RDN) of the output stage go to a high impedance during write mode.

Returning to FIG. 2, the illustrated reference generator circuit 64 provides a second reference voltage 78 (VREF2) using transistor Q2 and resistor R3. In one possible example, the transistors Q0 and Q2 are matched to one another, and the values of R2 and R3 are essentially equal, whereby the second reference voltage 78 is approximately the same as the first reference voltage 76 (e.g., 1 volt). A filter capacitor C0 is connected in parallel with R3 to provide a stable reference on the node 78 and mitigate transient glitching.

In addition, as shown in FIG. 2, the output stage 40 also includes a "read GM" circuit 66 with second and third transconductance amplifiers 96 and 98 (RGMP and RGMN in the figures). The second transconductance amplifier RGMP 96 has a non-inverting or positive (+) input 72 (INP) coupled with the second reference voltage 78 via resistor R6 (e.g., 400-500 ohms in one example) and a capacitor C1, along with an inverting or negative (−) input connected with the transconductance amplifier output to the first filter output node 52. The third transconductance amplifier RGMN 98 similarly has a non-inverting input 74 (INN) connected through a resistor R7 (e.g., 400-500 ohms) and a capacitor C2 to the second reference voltage 78, and the inverting input of the amplifier 98 is connected to its output at the second filter output node 54 as shown.

In operation, the second and third transconductance amplifiers 96 and 98 are activated by enabling the corresponding current sources I10 and I13 for a predetermined time when the pre-amplifier output stage 40 is transitioning from the write mode to the read mode (high going edge on READ signal 44) to source current to the first and second filter output nodes 52 and 54 in order to charge the high pass filter circuit capacitors C3 and C4. This enhanced precharging of the capacitors C3 and C4 facilitates fast switchover from write mode (in which no signals are received at the filter circuit input nodes 34 and 36) to the read mode, thereby quickly readying the capacitors C3 and C4 for receipt of incoming read data on the nodes 34 and 36. In addition, connection of the non-inverting (+) transconductance amplifier inputs of the amplifiers 96 and 98 to the second reference voltage 78 allows precharging of the capacitors C3 and C4 to a predetermined voltage, such as approximately equal to the second reference voltage value 78 (VREF2). In one possible embodiment, the mode control circuit 42 (FIG. 1 above) controls operation of the current sources I10 and I13 to be activated beginning with assertion of the READ mode control signal 44 and to be deactivated thereafter allowing some predetermined (e.g., or variable) time to allow proper charging of the capacitors C3 and C4 for entering the read mode. The transconductance amplifiers 96 and 98 are also used in certain embodiments to facilitate measurement of secondary test signals via the secondary test circuit 68 and the optional multiplexer 38 according to a first test mode signal 47 from the controller 42, as discussed further below in connection with FIG. 5.

Figures 5, 6:
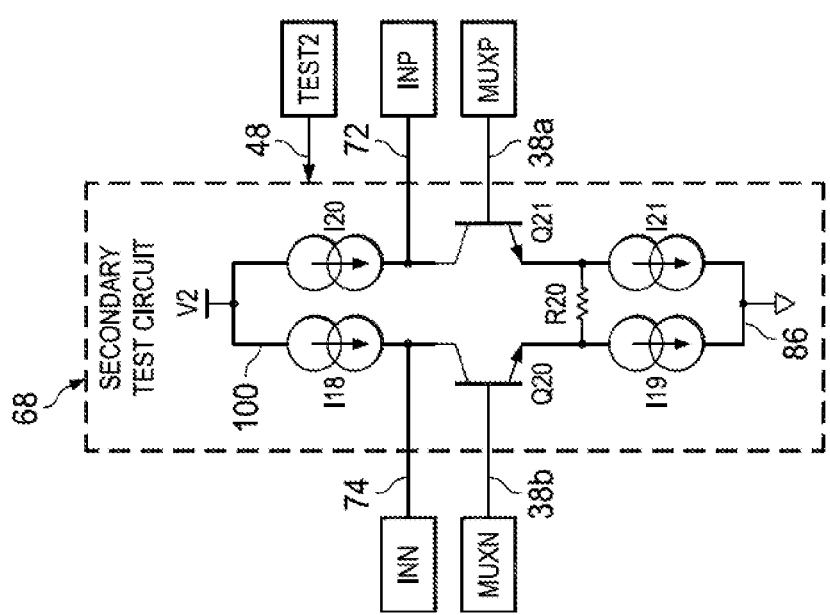
FIG. 5 is a schematic diagram illustrating an exemplary secondary test circuit which may be used in the output stage of FIGS. 1 and 2.
FIG. 6 is a table illustrating circuit operating states in the offset test circuit in various operational modes.

FIG. 6 illustrates the table 120 showing various operational modes of the exemplary pre-amplifier output stage 40, including a "READ" mode, a "WRITE" mode, a sub portion of the read mode for transitioning from write mode to read mode, as well as first and second test modes (TEST1 and TEST2). As seen in the table 120 of FIG. 6, the transconductance amplifier 80 of the regulator circuit 60 (RGMCM) is active or "ON" in all the listed modes, and the common mode regulator switching circuit 81 (FIGS. 1 and 2) is off (high impedance or open) in all the modes except for the write mode. In the illustrated embodiment, moreover, the reader output clamp circuit 58 (FIG. 4) is off in all the modes except for the write mode, and the reader GM transconductance amplifiers RGMP and RGMN 96 and 98 of the circuit 66 are activated (e.g., by activation of the corresponding current sources I10 and 113 in FIG. 2) only during the transition from write mode to read mode as discussed above, as well as in a second test mode TEST2. Furthermore, the offset test circuit 70 of FIG. 3 is activated only in a first test mode (TEST1) for monitoring offsets associated with the preceding gain stage or stages 32 directly at the driver outputs 26 and 28 as discussed further below. Moreover, the secondary test circuit 68 (FIGS. 1 and 5) is active only in the second test mode TEST2. Any suitable mode control circuitry 42 can be provided in the pre-amplifier 4 in order to control operation of these various circuits in the illustrated modes to implement the functionality described herein.

Referring now to FIGS. 2 and 3, the output stage 40 in certain embodiments includes an offset test circuit 70 with first and second emitter follower circuits including transistors Q1 and Q7 having inputs (base terminals) respectively connected to the filter inputs 34 and 36. The offset test circuit 70 also includes first and second differential pair circuits 102 and 104 connected to a second supply rail 100 (V2, which may be the same as V+ 84) and to the circuit ground 86. The first differential pair 102 includes PNP transistors Q4 and Q6 with emitter terminals coupled to one another through a resistor R5. The base terminals of Q4 and Q6 are individually connected to the corresponding outputs of the emitter follower circuits Q1 and Q7, and the collectors of Q4 and Q6 are connected to the filter output nodes 52 (RPC) and 54 (RPN). In the second differential pair circuit 104, emitter terminals of transistors Q3 and Q5 are coupled to one another through a resistor R4, and the corresponding base terminals are connected to the first and second driver output nodes 26 and 28 (RDP and RDN). In addition, the collector terminals of Q3 and Q5 are individually connected to the corresponding filter output nodes 52 and 54. The offset test circuit 70 is inactive when the pre-amplifier output stage 40 is in the read mode or the write mode (e.g., by the controller 42 disabling or turning off the corresponding current sources I3-I5, I8, I9 and I11. When the output stage 40 is in the first test mode (TEST1), the controller 42 activates the offset test circuit 70 to provide a differential voltage signal at the filter output nodes 52 and 54 based on a differential voltage signal at the filter inputs 34 and 36, and regulates a differential voltage signal at the driver output nodes 26 and 28 to be approximately the same as the differential voltage at the filter inputs 34 and 36. In this mode, moreover, the regulator switching circuit 81 is off such that the filter rail node 62 is disconnected from the second input 82 of the transconductance amplifier 80. The illustrated example thus provides two degenerated differential pairs, in which Q1 and Q7 receive the offset from the preceding reader stage or stages 32, and the signal is provided to Q4 and Q6 of the first differential pair 102. The collectors of Q4 and Q6 provide a signal to the nodes 52 and 54 (RPC and RNC), which controls the output voltage. The other differential pair 104 feeds back the output voltages from the pins 26 and 28 (RDP and RDN). For these amplifiers to be balanced, the output voltage at nodes 26 and 28 will be approximately equal to the offset voltage at the filter inputs 34 and 36. In this way, the offset can be easily measured on the reader output pins 26 and 28, and the output stage 40 thus advantageously allows easy measurement of the preceding state offset at the reader output pins 26 and 28 without passing through the high pass filter circuit 50.

Referring now to FIGS. 1, 2 and 5, certain embodiments of the output stage 40 further include a secondary test circuit 68 with NPN transistors Q20 and Q21 forming a differential pair circuit. The emitter terminals of Q20 and Q21 are coupled to one another through a resistor R20 and are biased via current sources 118-121 as shown. The collector terminals of Q20 and Q21 are individually connected to the corresponding inputs 74 (INN) and 72 (INP) of the transconductance amplifiers 98 and 96 (FIG. 2) and the base terminals of Q20 and Q21 are coupled to receive a differential secondary test voltage signal at nodes 38a and 38b, either directly from a component associated with the disk drive system 2, or indirectly (e.g., from the multiplexer 38 of FIG. 1). The secondary test circuit 68 of FIG. 5 is inactive in the read and write modes, and is activated in the secondary test mode (TEST2), for example, by the mode controller 42 (FIG. 1) asserting the secondary test mode signal 48 to turn on the current sources 118-121. When activated, the secondary test circuit 68 provides a differential output voltage signal to the inputs 72 and 74 of the second and third transconductance amplifiers 96 and 98 based on the differential secondary test voltage signal received at the inputs 38a and 38b. In one possible implementation, the output stage 40 includes a multiplexer circuit 38 (e.g., FIG. 1) which provides a differential voltage output signal on the lines 38a and 38b to the base terminals of Q20 and Q21 of the secondary test circuit 68 based on a selected one of a plurality of differential input voltage signals (e.g., the head disk interface sensor signals HDIP and HDIN from lines 20 and 22). During the secondary test mode, moreover, the transconductance amplifiers 96 and 98 provide a differential voltage at the filter output nodes 52 and 54 based on the differential output voltage at nodes 72 and 74 from the secondary test circuit 68. The driver circuit 56 in this embodiment remains activated (similar to read mode with the clamp circuit 58 disabled) to provide the differential driver output at the driver output nodes 26 and 28 based on the differential signal at the filter output nodes 52 and 54. In this manner, the secondary test circuit 68, the transconductance amplifiers 96 and 98, and the driver circuitry 56 advantageously allow direct measurement at the driver output nodes 26 and 28 of any selected signal in the pre-amplifier circuit 4 without the signal passing through the high pass filter 50, and the controller 42 (FIG. 1) can be operated during circuit testing to select any desired multiplexed signal via the multiplexer 38 for convenient measurement at the output terminals 26 and 28.

The described circuitry 40 thus advantageously allows the offset from one or more preceding gain stages 32, as well as other amplifier or sensor signals to be output on the reader outputs 26 and 28 for measurement without going through the high pass filter 50 by implementing the test modes TEST1 and TEST2. Moreover, the test signal measurement is done with the same regulated output common mode voltage. In addition, unlike conventional pre-amplifier output stages for disk drive systems, the disclosed circuitry maintains the same output common mode voltage from read to write mode without requiring an excessive number of circuit components, and is compatible with low power consumption designs.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A pre-amplifier output stage for a pre-amplifier of a disk drive system, the output stage comprising:
  a high pass filter circuit with first and second filter inputs that receive a differential input from a pre-amplifier gain stage, the high pass filter circuit providing a differential filter output to first and second filter output nodes, the high pass filter circuit comprising:
    a first capacitor connected between the first filter input and the first filter output node,
    a first filter resistance connected between the first filter output node and a filter rail node,
    a second capacitor connected between the second filter input and the second filter output node, and
    a second filter resistance connected between the second filter output node and the filter rail node;
  a driver circuit, comprising first and second driver inputs connected to the first and second filter output nodes and providing a differential driver output at first and second driver output nodes;
  a reference generator circuit providing a reference voltage;
  a regulator circuit operative when the pre-amplifier output stage is in a read mode for reading data from the disk drive system to source or sink current to or from the filter rail node to regulate common mode voltages at the first and second driver output nodes according to the reference voltage, the regulator circuit comprising:
- a transconductance amplifier with a first input connected to the reference voltage, a second input, and an output connected to the filter rail node,
- a first feedback resistor connected between the second input of the transconductance amplifier and the first driver output node, and
- a second feedback resistor connected between the second input of the transconductance amplifier and the second driver output node.

2. The pre-amplifier output stage of claim 1:
wherein the regulator circuit comprises a switching circuit connected between the filter rail node and the second input of the transconductance amplifier, the switching circuit being operative when the pre-amplifier output stage is in a write mode for writing data to the disk drive system to connect the filter rail node to the second input of the transconductance amplifier; and
wherein the regulator circuit is operative when the pre-amplifier output stage is in the write mode to source or sink current to or from the first and second feedback resistors to regulate the common mode voltages at the first and second driver output nodes according to the reference voltage.

3. The pre-amplifier output stage of claim 2, comprising a clamp circuit connected to the driver circuit to selectively place the differential driver output in a high impedance state when the pre-amplifier output stage is in the write mode.

4. The pre-amplifier output stage of claim 3, wherein the reference generator circuit provides a second reference voltage, and wherein the pre-amplifier output stage further comprises:
- a second transconductance amplifier with a first input coupled with the second reference voltage, a second input connected to the first filter output node, and an output connected to the first filter output node, the second transconductance amplifier operative when the pre-amplifier output stage is transitioning from the write mode to the read mode to source current to the first filter output node to charge the first capacitor of the high pass filter circuit; and
- a third transconductance amplifier with a first input coupled with the second reference voltage, a second input connected to the second filter output node, and an output connected to the second filter output node, the third transconductance amplifier operative when the pre-amplifier output stage is transitioning from the write mode to the read mode to source current to the second filter output node to charge the second capacitor of the high pass filter circuit.

5. The pre-amplifier output stage of claim 4, further comprising an offset test circuit including:
- first and second emitter follower circuits with corresponding first and second inputs connected to the first and second filter inputs, respectively, and corresponding first and second outputs;
- a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and
- a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes; and wherein the offset test circuit is inactive when the pre-amplifier output stage is in the read mode or the write mode, and the offset test circuit is active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs; and
wherein the switching circuit of the regulator circuit is operative when the pre-amplifier output stage is in the first test mode to disconnect the filter rail node from the second input of the transconductance amplifier.

6. The pre-amplifier output stage of claim 5, further comprising a secondary test circuit including first and second transistors forming a differential pair circuit, the first and second transistors having emitter terminals coupled to one another through a resistor, collector terminals individually connected to a corresponding one of the first inputs of the second and third transconductance amplifiers, and base terminals coupled to receive a differential secondary test voltage signal from a component associated with the disk drive system;
wherein the secondary test circuit is inactive when the pre-amplifier output stage is in the read mode or the write mode, and the secondary test circuit is active when the pre-amplifier output stage is in a secondary test mode to provide a differential output voltage signal to the first inputs of the second and third transconductance amplifiers based on the differential secondary test voltage signal;
wherein the second and third transconductance amplifiers are operative when the pre-amplifier output stage is in the secondary test mode to provide a differential voltage at the first and second filter output nodes based on the differential output voltage from the secondary test circuit; and
wherein the driver circuit is operative when the pre-amplifier output stage is in the secondary test mode to provide the differential driver output at the first and second driver output nodes according to the differential voltage at the first and second filter output nodes to allow measurement of the differential secondary test voltage signal at the first and second driver output nodes.

7. The pre-amplifier output stage of claim 2, wherein the reference generator circuit provides a second reference voltage, and wherein the pre-amplifier output stage further comprises:
- a second transconductance amplifier with a first input coupled with the second reference voltage, a second input connected to the first filter output node, and an output connected to the first filter output node, the second transconductance amplifier operative when the pre-amplifier output stage is transitioning from the write mode to the read mode to source current to the first filter output node to charge the first capacitor of the high pass filter circuit; and
- a third transconductance amplifier with a first input coupled with the second reference voltage, a second input connected to the second filter output node, and an output connected to the second filter output node, the third transconductance amplifier operative when the pre-amplifier output stage is transitioning from the write mode to the read mode to source current to the second filter output node to charge the second capacitor of the high pass filter circuit.

8. The pre-amplifier output stage of claim 7, further comprising an offset test circuit including:
  first and second emitter follower circuits with corresponding first and second inputs connected to the first and second filter inputs, respectively, and corresponding first and second outputs;
  a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and
  a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes; and
  wherein the offset test circuit is inactive when the pre-amplifier output stage is in the read mode or the write mode, and the offset test circuit is active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs; and
  wherein the switching circuit of the regulator circuit is operative when the pre-amplifier output stage is in the first test mode to disconnect the filter rail node from the second input of the transconductance amplifier.

9. The pre-amplifier output stage of claim 7, further comprising a secondary test circuit including first and second transistors forming a differential pair circuit, the first and second transistors having emitter terminals coupled to one another through a resistor, collector terminals individually connected to a corresponding one of the first inputs of the second and third transconductance amplifiers, and base terminals coupled to receive a differential secondary test voltage signal from a component associated with the disk drive system;
  wherein the secondary test circuit is inactive when the pre-amplifier output stage is in the read mode or the write mode, and the secondary test circuit is active when the pre-amplifier output stage is in a secondary test mode to provide a differential output voltage signal to the first inputs of the second and third transconductance amplifiers based on the differential secondary test voltage signal;
  wherein the second and third transconductance amplifiers are operative when the pre-amplifier output stage is in the secondary test mode to provide a differential voltage at the first and second filter output nodes based on the differential output voltage from the secondary test circuit; and
  wherein the driver circuit is operative when the pre-amplifier output stage is in the secondary test mode to provide the differential driver output at the first and second driver output nodes according to the differential voltage at the first and second filter output nodes to allow measurement of the differential secondary test voltage signal at the first and second driver output nodes.

10. The pre-amplifier output stage of claim 2, further comprising a secondary test circuit including first and second transistors forming a differential pair circuit, the first and second transistors having emitter terminals coupled to one another through a resistor, collector terminals individually connected to a corresponding one of the first inputs of the second and third transconductance amplifiers, and base terminals coupled to receive a differential secondary test voltage signal from a component associated with the disk drive system;
  wherein the secondary test circuit is inactive when the pre-amplifier output stage is in the read mode or the write mode, and the secondary test circuit is active when the pre-amplifier output stage is in a secondary test mode to provide a differential output voltage signal to the first inputs of the second and third transconductance amplifiers based on the differential secondary test voltage signal;
  wherein the second and third transconductance amplifiers are operative when the pre-amplifier output stage is in the secondary test mode to provide a differential voltage at the first and second filter output nodes based on the differential output voltage from the secondary test circuit; and
  wherein the driver circuit is operative when the pre-amplifier output stage is in the secondary test mode to provide the differential driver output at the first and second driver output nodes according to the differential voltage at the first and second filter output nodes to allow measurement of the differential secondary test voltage signal at the first and second driver output nodes.

11. The pre-amplifier output stage of claim 1, wherein the reference generator circuit provides a second reference voltage, and wherein the pre-amplifier output stage further comprises:
  a second transconductance amplifier with a first input coupled with the second reference voltage, a second input connected to the first filter output node, and an output connected to the first filter output node, the second transconductance amplifier operative when the pre-amplifier output stage is transitioning from the write mode to the read mode to source current to the first filter output node to charge the first capacitor of the high pass filter circuit; and
  a third transconductance amplifier with a first input coupled with the second reference voltage, a second input connected to the second filter output node, and an output connected to the second filter output node, the third transconductance amplifier operative when the pre-amplifier output stage is transitioning from the write mode to the read mode to source current to the second filter output node to charge the second capacitor of the high pass filter circuit.

12. The pre-amplifier output stage of claim 11, further comprising an offset test circuit including:
  first and second emitter follower circuits with corresponding first and second inputs connected to the first and second filter inputs, respectively, and corresponding first and second outputs;
  a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes; and wherein the offset test circuit is inactive when the pre-amplifier output stage is in the read mode or a write mode, and the offset test circuit is active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs.

13. The pre-amplifier output stage of claim 11, further comprising a secondary test circuit including first and second transistors forming a differential pair circuit, the first and second transistors having emitter terminals coupled to one another through a resistor, collector terminals individually connected to a corresponding one of the first inputs of the second and third transconductance amplifiers, and base terminals coupled to receive a differential secondary test voltage signal from a component associated with the disk drive system;

wherein the secondary test circuit is inactive when the pre-amplifier output stage is in the read mode or a write mode, and the secondary test circuit is active when the pre-amplifier output stage is in a secondary test mode to provide a differential output voltage signal to the first inputs of the second and third transconductance amplifiers based on the differential secondary test voltage signal;

wherein the second and third transconductance amplifiers are operative when the pre-amplifier output stage is in the secondary test mode to provide a differential voltage at the first and second filter output nodes based on the differential output voltage from the secondary test circuit; and wherein the driver circuit is operative when the pre-amplifier output stage is in the secondary test mode to provide the differential driver output at the first and second driver output nodes according to the differential voltage at the first and second filter output nodes to allow measurement of the differential secondary test voltage signal at the first and second driver output nodes.

14. The pre-amplifier output stage of claim 1, further comprising an offset test circuit including:

first and second emitter follower circuits with corresponding first and second inputs connected to the first and second filter inputs, respectively, and corresponding first and second outputs;

a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes; and wherein the offset test circuit is inactive when the pre-amplifier output stage is in the read mode or a write mode, and the offset test circuit is active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs.

15. The pre-amplifier output stage of claim 1, wherein the reference generator circuit provides a second reference voltage, and wherein the pre-amplifier output stage further comprises:

a second transconductance amplifier with a first input coupled with the second reference voltage, a second input connected to the first filter output node, and an output connected to the first filter output node;

a third transconductance amplifier with a first input coupled with the second reference voltage, a second input connected to the second filter output node, and an output connected to the second filter output node; and a secondary test circuit including first and second transistors forming a differential pair circuit, the first and second transistors having emitter terminals coupled to one another through a resistor, collector terminals individually connected to a corresponding one of the first inputs of the second and third transconductance amplifiers, and base terminals coupled to receive a differential secondary test voltage signal from a component associated with the disk drive system;

wherein the secondary test circuit is inactive when the pre-amplifier output stage is in the read mode or a write mode, and the secondary test circuit is active when the pre-amplifier output stage is in a secondary test mode to provide a differential output voltage signal to the first inputs of the second and third transconductance amplifiers based on the differential secondary test voltage signal;

wherein the second and third transconductance amplifiers are operative when the pre-amplifier output stage is in the secondary test mode to provide a differential voltage at the first and second filter output nodes based on the differential output voltage from the secondary test circuit; and wherein the driver circuit is operative when the pre-amplifier output stage is in the secondary test mode to provide the differential driver output at the first and second driver output nodes according to the differential voltage at the first and second filter output nodes to allow measurement of the differential secondary test voltage signal at the first and second driver output nodes.

16. The pre-amplifier output stage of claim 15, further comprising a multiplexer circuit providing a differential voltage output signal to the base terminals of the first and second transistors of the secondary test circuit based on a selected one of a plurality of differential input voltage signals.

17. A disk drive pre-amplifier circuit, comprising:
at least one gain stage receiving an input signal from a magnetoresistive sensor of a disk drive system; and
an output stage, comprising:
a high pass filter circuit with first and second filter inputs that receive a differential input from the at least one gain stage, the high pass filter circuit providing a differential filter output to first and second filter output nodes, a driver circuit, comprising first and second driver inputs connected to the first and second filter output nodes and providing a differential driver output at first and second driver output nodes, a regulator circuit operative when the pre-amplifier circuit is in a read mode for reading data from the disk drive system or a write mode for writing data to the disk drive system to regulate common mode voltages at the first and second driver output nodes to a predetermined value, and an offset test circuit inactive when the pre-amplifier circuit is in the read mode or a write mode, and active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs, wherein the offset test circuit comprises:

first and second emitter follower circuits with corresponding first and second inputs connected to the first and second filter inputs, respectively, and corresponding first and second outputs;

a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes.

18. The disk drive pre-amplifier circuit of claim 17, wherein the output stage comprises:

a first transconductance amplifier with a first input coupled with a reference voltage, a second input connected to the first filter output node, and an output connected to the first filter output node;

a second transconductance amplifier with a first input coupled with the reference voltage, a second input connected to the second filter output node, and an output connected to the second filter output node; and a secondary test circuit including first and second transistors forming a differential pair circuit, the first and second transistors having emitter terminals coupled to one another through a resistor, collector terminals individually connected to a corresponding one of the first inputs of the first and second transconductance amplifiers, and base terminals coupled to receive a differential secondary test voltage signal from a component associated with the disk drive system;

wherein the secondary test circuit is inactive when the pre-amplifier circuit is in the read mode or the write mode, and the secondary test circuit is active when the pre-amplifier circuit is in a secondary test mode to provide a differential output voltage signal to the first inputs of the first and second transconductance amplifiers based on the differential secondary test voltage signal;

wherein the first and second transconductance amplifiers are operative when the pre-amplifier circuit is in the secondary test mode to provide a differential voltage at the first and second filter output nodes based on the differential output voltage from the secondary test circuit; and wherein the driver circuit is operative when the pre-amplifier circuit is in the secondary test mode to provide the differential driver output at the first and second driver output nodes according to the differential voltage at the first and second filter output nodes to allow measurement of the differential secondary test voltage signal at the first and second driver output nodes.

19. A pre-amplifier output stage for a pre-amplifier of a disk drive system, the output stage comprising: a high pass filter circuit with first and second filter inputs that receive a differential input from a pre-amplifier gain stage, and first and second filter output nodes providing a differential filter output; a driver circuit, comprising first and second driver inputs connected to the first and second filter output nodes and providing a differential driver output at first and second driver output nodes; a regulator circuit operative when the pre-amplifier circuit is in a read mode for reading data from the disk drive system or a write mode for writing data to the disk drive system to regulate common mode voltages at the first and second driver output nodes to a predetermined value; and an offset test circuit inactive when the pre-amplifier circuit is in the read mode or a write mode, and active when the pre-amplifier output stage is in a first test mode to provide a differential voltage signal at the first and second filter output nodes based on a differential voltage signal at the first and second filter inputs to regulate a differential voltage signal at the first and second driver output nodes to be approximately the same as the differential voltage signal at the first and second filter inputs; wherein the offset test circuit comprises:

first and second emitter follower circuits with corresponding first and second inputs connected to the first and second filter inputs, respectively, and corresponding first and second outputs; a first differential pair circuit comprising first and second transistors with emitter terminals coupled to one another through a resistor, base terminals individually connected to a corresponding output of the first and second emitter follower circuits, and collector terminals individually connected to a corresponding one of the first and second filter output nodes; and a second differential pair circuit comprising first and second transistors with emitter terminals coupled to one another through a resistor, base terminals individually connected to a corresponding one of the first and second driver output nodes, and collector terminals individually connected to a corresponding one of the first and second filter output nodes.

* * * * *